(No Model.)
J. R. KUNZELMAN.
WAGON.
No. 430,131. Patented June 17, 1890.
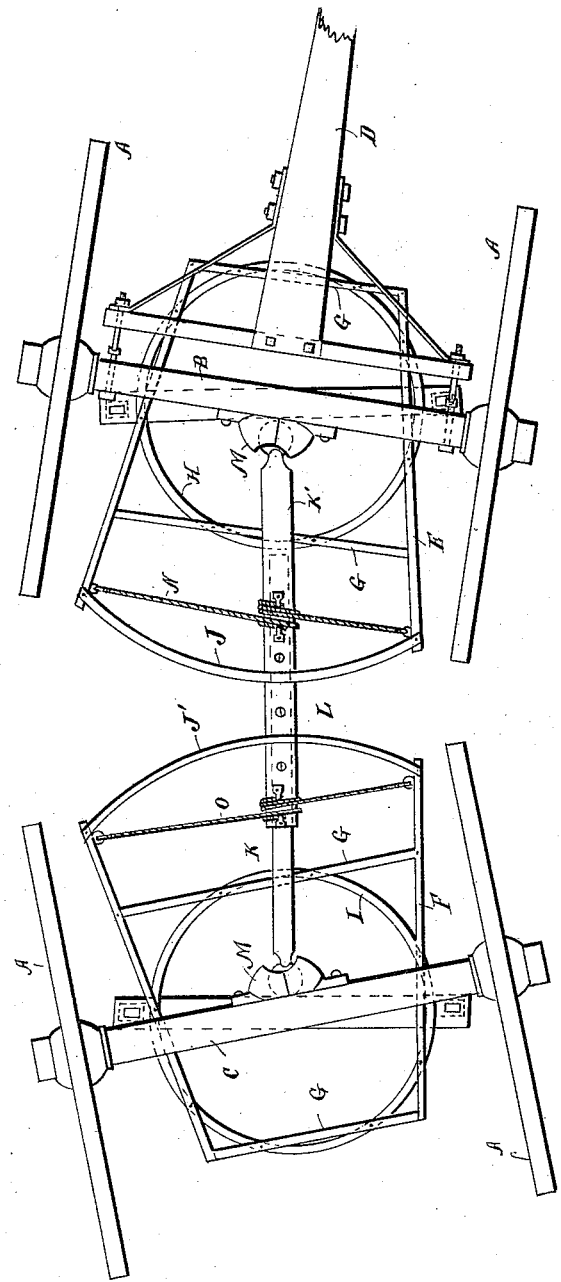
Witnesses
Geo. F. Wheelock
J. Wm. Cister
Inventor
John R. Kunzelman
By his Attorney
Morris J. Foote

UNITED STATES PATENT OFFICE.

JOHN R. KUNZELMAN, OF STILLWATER, MINNESOTA.

WAGON.

SPECIFICATION forming part of Letters Patent No. 430,131, dated June 17, 1890.

Application filed July 23, 1889. Serial No. 318,349. (No model.)

*To all whom it may concern:*

Be it known that I, JOHN R. KUNZELMAN, a citizen of the United States of America, residing at Stillwater, in the county of Washington and State of Minnesota, have invented certain new and useful Improvements in Carriages and Wagons, of which the following is a specification, reference being had therein to the accompanying drawing.

My invention relates to an improvement in the running-gear of carriages and wagons; and it consists, primarily, in the provision of means by which the front and rear axles carrying their respective wheels are coned relatively to one another, so that the turning of curves is facilitated, which means I shall now proceed to fully describe, the specific points of novelty in which I shall particularly point out in the appended claims.

In the accompanying drawing the figure represents a plan view of a wagon from the under side thereof.

A A are the wheels, which are constructed as in the ordinary wagon or carriage, except that the front and rear wheels are preferably of the same diameter.

B and C are the front and rear axles, respectively.

D is the tongue, made, preferably, flat, and attached to the forward axle B by means of bolts $b$ $b$ or a clip and hinge-joint between the tongue and axle.

E E and F F are hounds situate, respectively, upon the front axle B and rear axle C, said axles being countersunk into the said hounds and bolted thereto in the usual manner.

G G are cross-bars connecting the hounds E E F F at or near each of their extremities.

H and I are circles resting, respectively, upon the hounds E E and F F and cross-bars G G, being firmly bolted thereto.

J J' are segmental sway-bars; also, I provide corresponding sway-bars (not shown) on the opposite sides of the bars J J', and bolt said bars to the extreme ends of the hounds E E and F F, and also the bars J J' as well.

K K' are the two parts of a reach L, the part K' being made hollow for a portion of its length, into which the part K may be telescoped, being held in position by means of set-screws $k$ $k$ or other suitable binding device. These parts K K' of the reach L may be attached to the forward and rear axles B and C by means of the ball-and-socket joint M or other universal joint.

N O are wire ropes or chains, having one of their ends secured to the hounds E E F F, respectively, their remaining ends being secured to ears on the reach L, a turn of the chains N O being made first around said reach. It will therefore be seen that when the forward axle B is turned the reach L is rotated by the chain N, and said motion is imparted to the chain O, which in turn causes the rear axle C to assume such a relative position as that the said front and rear axles are coned.

Having thus described my invention, what I claim as new therein, and desire to secure by Letters Patent, is the following:

1. In combination, the front and rear axles B C, the rotatable reach connecting them, the hounds E, rigidly secured to the front axle, the chains N, secured at one end to the hounds E and at the other to the reach, the hounds F, rigidly secured to the rear axle, and the chains O, secured at one end to the hounds F and at the other to the reach, substantially as set forth.

2. The combination of the axles, a rotatable reach connecting them, universal joints between said reach and axles, the hounds E and F, rigidly secured to the axles, and the chains N and O, connected, respectively, to the hounds and reach, as set forth.

3. The combination, with the front and rear axle of a carriage or wagon, of an adjustable reach formed of two parts telescoping together, each of said parts being secured to the said front and rear axles by means of a universal joint, as set forth.

In testimony whereof I affix my signature in presence of two witnesses.

JOHN R. KUNZELMAN.

Witnesses:
H. R. MURDOCK,
F. V. CUNFORT.